United States Patent
Todi et al.

(10) Patent No.: US 12,498,982 B2
(45) Date of Patent: Dec. 16, 2025

(54) AUTOMATED PREDICTIVE INFRASTRUCTURE SCALING

(71) Applicant: Dell Products L.P., Round Rock, TX (US)

(72) Inventors: Bhaskar Todi, Madhya Pradesh (IN); James S. Watt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 609 days.

(21) Appl. No.: 17/490,049

(22) Filed: Sep. 30, 2021

(65) Prior Publication Data

US 2023/0116810 A1   Apr. 13, 2023

(51) Int. Cl.
*G06F 8/60* (2018.01)
*G06F 9/355* (2018.01)
*G06F 9/50* (2006.01)

(52) U.S. Cl.
CPC .......... *G06F 9/505* (2013.01); *G06F 9/3555* (2013.01); *G06F 9/5077* (2013.01); *G06F 2209/5019* (2013.01)

(58) Field of Classification Search
CPC ...... G06F 9/505; G06F 9/3555; G06F 9/5077; G06F 2209/5019
See application file for complete search history.

(56) References Cited

U.S. PATENT DOCUMENTS

| | | | |
|---|---|---|---|
| 10,826,789 B2 | 11/2020 | Savoor et al. | |
| 10,891,168 B2 | 1/2021 | Smola et al. | |
| 11,409,576 B2 * | 8/2022 | Ghafourifar | .......... G06F 9/5027 |
| 12,353,908 B2 * | 7/2025 | Sivathanu | ............... G06F 9/505 |
| 2004/0139433 A1 * | 7/2004 | Blythe | ................... G06Q 50/06 718/100 |
| 2015/0365309 A1 * | 12/2015 | Kaminski | ............... H04L 47/83 709/224 |
| 2019/0272200 A1 * | 9/2019 | Chen | ......................... G06F 9/50 |
| 2021/0218672 A1 | 7/2021 | Mackle et al. | |
| 2022/0318674 A1 * | 10/2022 | Shukla | ................... G06N 20/00 |

* cited by examiner

*Primary Examiner* — Kevin L Young
*Assistant Examiner* — Abdou K Seye
(74) *Attorney, Agent, or Firm* — Ryan, Mason & Lewis, LLP (57) ABSTRACT

Methods, apparatus, and processor-readable storage media for automated predictive infrastructure scaling are provided herein. An example computer-implemented method includes generating infrastructure scaling predictions by processing, using a motion-based model, historical data pertaining to number of requests for resources for a given time interval and historical data pertaining to a rate of change in the number of requests; determining a trend based on moving average values pertaining to the historical data; determining a utilization target related to the resources based on the trend; calculating a standard deviation for resource demand based on historical utilization data pertaining to the resources; separating the standard deviation into zones related to levels of utilization of the resources; identifying one of the zones for infrastructure scaling in a future time interval based on the utilization target; updating the predictions by fitting the predictions to the identified zone; and performing automated actions based on the updated predictions.

20 Claims, 6 Drawing Sheets

```
INPUT utilizationTargets
FOR every time interval t

INPUT numberOfRequests

COMPUTE requestVelocity with numberOfRequests
    COMPUTE requestAccleration with numberOfRequests
    COMPUTE newtonianPrediction with numberOfRequests, requestVelocity, requestAccleration COMPUTE shortSMA with numberOfRequests
    COMPUTE longSMA with numberOfRequests
    COMPUTE requestTrend with numberOfRequests, shortSMA, longSMA COMPUTE trendUtilizationTarget with requestTrend, utilizationTargets COMPUTE requestStandardDeviation with numberOfRequests
    COMPUTE requestStandardDeviationZones with requestStandardDeviation, trendUtilizationTarget COMPUTE requestPrediction with newtonianPrediction, requestStandardDeviationZones CALL cloudInfrastructureScaler with requestPrediction

ENDFOR
```

AUTOMATED PREDICTIVE INFRASTRUCTURE SCALING

FIELD

The field relates generally to information processing systems, and more particularly to techniques for resource management using such systems.

BACKGROUND

Using conventional approaches, virtual infrastructure footprints are often statically sized for the maximum amount of load that a given workload may present. Additionally, some conventional approaches attempt to provide methods for scaling which include scheduled scaling (e.g., scaling at specific predetermined times of day) and scaling responsive to over-utilization when resource thresholds are exceeded. However, such methods present problems related to delays and performance degradation. For example, in addition to the latency created by responsive methods, when individual units of work have variances in central processing unit (CPU) and/or memory demands, those metrics, commonly used by conventional approaches, can be unreliable as indicators of system stress.

SUMMARY

Illustrative embodiments of the disclosure provide techniques for automated predictive infrastructure scaling. An exemplary computer-implemented method includes generating one or more infrastructure scaling predictions for at least one system by processing, using at least one motion-based model, historical data pertaining to number of requests for one or more resources for a given time interval and historical data pertaining to a rate of change in the number of requests for the one or more resources for the given time interval. The method also includes determining at least one trend based at least in part on moving average values pertaining to the historical data pertaining to number of requests and the historical data pertaining to the rate of change in the number of requests, and determining at least one utilization target related to at least a portion of the one or more resources based at least in part on the at least one trend. Additionally, the method includes calculating at least one standard deviation for resource demand based at least in part on historical utilization data pertaining to the one or more resources, separating the at least one standard deviation into multiple zones related to levels of utilization of the one or more resources, and identifying at least one of the multiple zones for infrastructure scaling in at least one future time interval based at least in part on the at least one utilization target. Further, the method also includes updating the one or more infrastructure scaling predictions by fitting the one or more infrastructure scaling predictions to the at least one identified zone, and performing one or more automated actions based at least in part on the one or more updated infrastructure scaling predictions.

Illustrative embodiments can provide significant advantages relative to conventional approaches. For example, problems associated with delays and performance degradation are overcome in one or more embodiments through automatically predicting infrastructure scaling values based at least in part on model-based analysis of historical utilization data, standard deviation data, trend data, and/or resource utilization target data.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
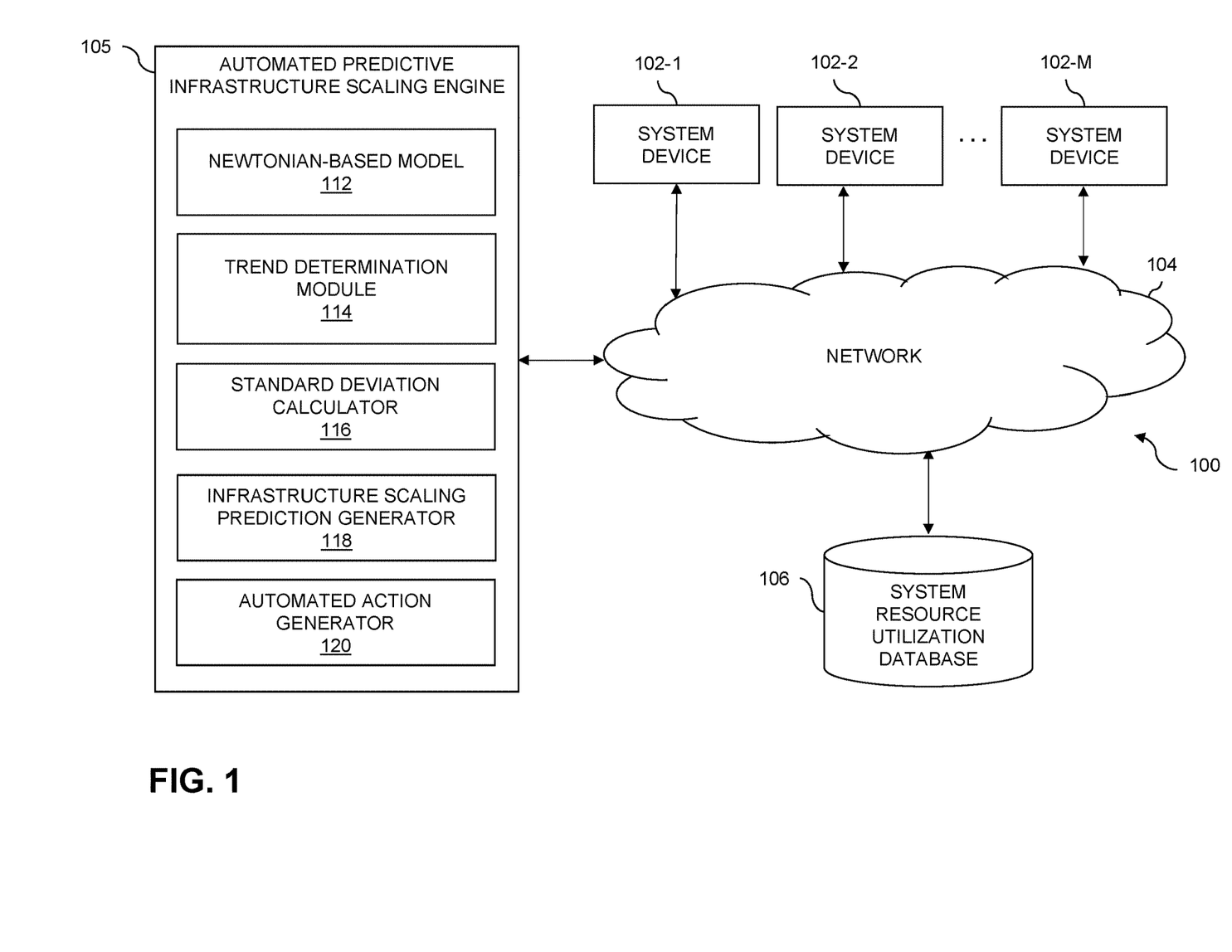
FIG. 1 shows an information processing system configured for automated predictive infrastructure scaling in an illustrative embodiment.

FIG. 1 shows a computer network (also referred to herein as an information processing system) 100 configured in accordance with an illustrative embodiment. The computer network 100 comprises a plurality of system devices 102-1, 102-2, . . . 102-M, collectively referred to herein as system devices 102. The system devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated predictive infrastructure scaling engine 105.

The system devices 102 may comprise, for example, mobile telephones, laptop computers, tablet computers, desktop computers, servers, or other types of computing devices. Such devices are examples of what are more generally referred to herein as "processing devices." Some of these processing devices are also generally referred to herein as "computers."

The system devices 102 in some embodiments comprise respective computers associated with a particular company, organization, group of users, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated predictive infrastructure scaling engine 105 can have an associated system resource utilization database 106 configured to store data pertaining to historical data pertaining to resource utilization and resource requests, which comprise, for example, data related to resources such as CPU, memory, etc.

The system resource utilization database 106 in the present embodiment is implemented using one or more storage systems associated with automated predictive infrastructure scaling engine 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated predictive infrastructure scaling engine 105 are one or more input-output devices, which illustratively comprise keyboards, displays or other types of input-output devices in any combination. Such input-output devices can be used, for example, to support one or more user interfaces to automated predictive infrastructure scaling engine 105, as well as to support communication between automated predictive infrastructure scaling engine 105 and other related systems and devices not explicitly shown.

Additionally, automated predictive infrastructure scaling engine 105 in the FIG. 1 embodiment is assumed to be implemented using at least one processing device. Each such processing device generally comprises at least one processor and an associated memory, and implements one or more functional modules for controlling certain features of automated predictive infrastructure scaling engine 105.

More particularly, automated predictive infrastructure scaling engine 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated predictive infrastructure scaling engine 105 to communicate over the network 104 with the system devices 102, and illustratively comprises one or more conventional transceivers.

The automated predictive infrastructure scaling engine 105 further comprises a Newtonian-based model 112, a trend determination module 114, a standard deviation calculator 116, an infrastructure scaling prediction generator 118, and an automated action generator 120.

It is to be appreciated that this particular arrangement of elements 112, 114, 116, 118 and 120 illustrated in the automated predictive infrastructure scaling engine 105 of the FIG. 1 embodiment is presented by way of example only, and alternative arrangements can be used in other embodiments. For example, the functionality associated with elements 112, 114, 116, 118 and 120 in other embodiments can be combined into a single module, or separated across a larger number of modules. As another example, multiple distinct processors can be used to implement different ones of elements 112, 114, 116, 118 and 120 or portions thereof.

At least portions of elements 112, 114, 116, 118 and 120 may be implemented at least in part in the form of software that is stored in memory and executed by a processor.

It is to be understood that the particular set of elements shown in FIG. 1 for automated predictive infrastructure scaling involving system devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated predictive infrastructure scaling engine 105 and system resource utilization database 106 can be on and/or part of the same processing platform.

An exemplary process utilizing elements 112, 114, 116, 118 and 120 of an example automated predictive infrastructure scaling engine 105 in computer network 100 will be described in more detail with reference to the flow diagram of FIG. 4.

Accordingly, at least one embodiment includes automated predictive infrastructure scaling of virtual infrastructure for workloads that require variable amounts of resources. Such an embodiment includes predicting required job slot capacity and considering at least one resource (e.g., CPU, memory, etc.) utilization target, in connection with preemptive scaling to prevent over-utilization, queuing, and/or performance degradation.

As detailed herein, one or more embodiments include generating and/or implementing a model which uses one or more motion-based equations, which can include, for example, Newtonian and/or Newtonian-based equations of motion and/or other equations, to determine acceleration and velocity of demand that provides a predicted number of jobs needed to be served in the next period(s) of a given duration. The model, in such an embodiment, further includes calculating the standard deviation of demand based at least in part on historical usage patterns, and conforming the above-noted prediction(s) to values that are historically accurate and mathematically safe. As used herein, mathematically "safe" indicates that the predictions are not only supported by the historical data but also the algorithm which uses sophisticated mathematical functions and computations to reach the result. Such an embodiment includes ensuring that the result does not greatly exceed one or more terms limits such as, for example, provisioning 5× of the required infrastructure.

Additionally, at least one embodiment can also include identifying one or more trends (e.g., short-term trends and/or long-term trends) by calculating and using one or more moving averages to identify trend changes (e.g., by monitoring trend crossover behavior). For example, when a short-term simple moving average (SMA) crosses a long term SMA, such a determination can be used as a momentum indicator showing that the current demand trend is slowing. Using such a model, for example, increases resource utilization and can facilitate significant reductions in provisioned infrastructure.

As used herein, a workload refers to a stream (e.g., a continuous stream) of requests for one or more resources, either through a web service or queue, that is serviced by some backend infrastructure. Also, a job, as used herein, refers to an individual request to a workload system. Additionally, scaling out refers to increasing the consumed infrastructure footprint of a particular workload, while scaling in refers to decreasing the consumed infrastructure footprint of a particular workload. As also used herein, infrastructure refers to physical and/or virtual hosting of resources (e.g., compute resources), and utilization refers to the calculation of the percentage of capacity used by a system at a given period of time. As noted above and further detailed herein, SMA can be calculated for given a period of time and a given number of periods (e.g., a seven period SMA in a one hour period of time).

As also detailed above and herein, one or more embodiments include generating predictions using one or more motion-based equations (e.g., Newtonian-based equations) which describe the behavior of a system as a set of mathematical functions in terms of one or more dynamic variables. Such variables can include, for example, generalized coordinates (e.g., spatial coordinates or coordinates pertaining to any variable characteristic of the system in question), time, momentum components, etc.

By way of example, kinematics is typically used in connection with variables derived from the positions of objects and time. In circumstances of constant acceleration, such motion-based equations are often referred to as the SUVAT equations, arising from the definitions of kinematic quantities: displacement(s), initial velocity (u), final velocity (v), acceleration (a), and time (1). A differential equation of motion, often identified, for instance, as some physical law and applying definitions of physical quantities, can be used to set-up an equation for a problem. Solving the differential equation will lead to a general solution with arbitrary constants, the arbitrariness corresponding to a family of solutions. A particular solution can be obtained by setting the initial values, which fixes the values of the constants.

Accordingly, one or more embodiments includes considering incoming requests or traffic as displacement in the above equations. In such an embodiment, based at least in part on historical data, the velocity (i.e., the change in the number of incoming requests for a given time interval), and the acceleration (i.e., the rate of change in velocity) can be determined. Therefore, in an example embodiment, the following equation holds true and can be used to predict the number of incoming requests based on the current velocity and acceleration for any arbitrary time interval:

$$s=ut+\frac{1}{2}at^2$$

wherein s is the number of incoming requests, u is the velocity of incoming requests, a is the acceleration of incoming requests, and/is any arbitrary time interval.

As detailed herein, at least one embodiment also includes incorporating statistical dispersion. In statistics, dispersion (also referred to as variability, scatter, or spread) is the extent to which a distribution is stretched or squeezed. Common examples of measures of statistical dispersion can include variance, standard deviation, and interquartile range. Dispersion can be contrasted with location or central tendency, and together they represent commonly used properties of distributions.

By way of example, a measure of statistical dispersion can include a non-negative real number that is zero if all of the data are the same, and increases as the data become more diverse. One or more embodiments include using standard deviation to evaluate statistical dispersion. In such an embodiment, a low standard deviation indicates that the values tend to be close to the mean (also referred to as the expected value) of the set, while a high standard deviation indicates that the values are spread out over a wider range.

The standard deviation of a random variable, sample, statistical population, dataset, or probability distribution can include, for example, the square root of its variance. Additionally, unlike the variance, the standard deviation can be expressed in the same unit as the data. Standard deviation can be used to compare real-world data against a model to test the model, and one practical value of understanding the standard deviation of a set of values is in appreciating how much variation there is from the average (i.e., mean).

By way of example, Chebyshev's inequality ensures that, for all distributions for which the standard deviation is defined, a given amount of data is within a few standard deviations of the mean. Chebyshev's inequality claims that no more than $1/k^2$ of the distribution's values can be k or more standard deviations away from the mean (or equivalently, over $1-1/k^2$ of the distribution's values are less than k standard deviations away from the mean). Its practical usage is similar to the 68-95-99.7 rule, which states, in part, that a minimum of about 95% of values must lie within two standard deviations of the mean and about 99.7% within three standard deviations.

At least one embodiment can include using the above theory and deducing that if infrastructure is provisioned to support enough slots for workload demand defined by standard deviation principles, it is unlikely that more than three standard deviations from historical usage patterns will need to be provisioned in a moving window of historical data. One or more embodiments can also include determining a number of zones (e.g., 10 zones) for utilization at a given interval (e.g., an interval of 0.5 standard each from −2 standard deviation to 2.5 standard deviation). In an example implementation, approximately 97% of data should fall within these zones, which provides guidance for how large or small the corresponding infrastructure footprint should be.

Identifying the standard deviation of workload demand facilitates creation and/or implementation of a model of historical usage that helps define scaling constraints and helps increase accuracy when combined with Newtonian and/or Newtonian-based predictions. Additionally, one or more embodiments also include using a parameter referred to as utilization target percentage. Utilization target percentage represents the ideal percentage of job slots available in the system that are to be occupied at any given moment.

Accordingly, such an embodiment includes taking the Newtonian-based prediction of utilization and comparing it against at least one of the zones (e.g., one of the 10 zones) defined by the standard deviation calculations. Once the predicted zone is identified, such an embodiment then includes determining if the prediction is above or below the corresponding utilization target percentage. In one or more embodiments, the utilization target can be set and/or determined by operations administrators or product managers and/or leaders. The utilization target, in such an embodiment, defines the level of discretion and/or variability permitted in terms of resource utilization and can directly impact the operating costs and/or product performance.

Referring again to the Newtonian-based prediction, if the prediction is below the utilization target percentage in the target zone, then the target zone is deemed satisfactory. However, if the prediction is above the utilization target percentage in the target zone, then the next largest zone (for scaling out) or next smallest zone (for scaling in) is selected as the target or predicted zone of usage.

Further, at least one embodiment includes incorporating traffic trends using moving averages. In connection with moving averages, a trend is a curve that is continuing to move in a certain direction. There are typically three usual trends that curves can follow: an uptrend (also referred to as a bullish trend), indicating that the values in the curve are moving higher; a downtrend (also referred to as a bearish trend), indicating that the values in the curve are moving lower; and a sideways trend, wherein the values in the curve are moving sideways.

As used herein, a moving average is an average value for a metric using a specified time period. An example moving average for a specified time period, say t, can be calculated by taking the value for the last/intervals of any metric and adding them together. The result from the addition calculation is then divided by the number of periods, t. To continue to calculate the moving average on a regular basis, replace the oldest value with the most recent value and carry out the same above-noted steps.

When a given metric crosses below a corresponding moving average, such a determination can be used as a signal for a trend reversal. A move below the moving average suggests that the downtrend is in control and the metric value will likely move lower. Conversely, crossing above a moving average suggests that the uptrend is in control and that the metric value will move higher.

Additionally or alternatively, one or more embodiments includes identifying trends by relying on the crossing of two or more moving averages. An example signal can be given when the short-term moving average crosses above or below the longer-term moving average. Using two or more moving averages facilitates seeing a longer-term trend compared to a shorter-term moving average; it is also an efficient method for determining whether a given trend is gaining strength or if it the given trend is likely to reverse.

By using a cross strategy, for example, when the short-term moving average crosses below the long-term moving average, a short downtrend is indicated. The converse is true for a short uptrend. When both the short-term and long-term moving averages are under the actual metric curve, a long downtrend is indicated. The converse is true for a long uptrend.

It should also be noted that one or more embodiments are not limited to SMAs in such calculations, and other measures and/or calculations (e.g., exponential moving averages (EMA)) can be used.

Additionally, in at least one embodiment, the inputs to a model such as detailed herein can vary based on the trend(s) of the data. Allowing variables of the model to change based on trending allows different scaling parameters to be used in different situations (for example, scaling out might be more aggressive than scaling in, or vice versa, depending on the use case).

Accordingly, as detailed herein, one or more embodiments include predictive infrastructure scaling by combining the three above-described methods for scaling for workload demand. The Newton and/or Newtonian-based equations of motion provide at least one prediction, while the standard deviation constrains more aggressive scaling to limit over-provisioning and under-provisioning during periods of rapid demand changes. These models can be further combined with trend identification from SMA models to improve the resource utilization by facilitating customization of the scaling parameters based on trending data.

Figure 2:
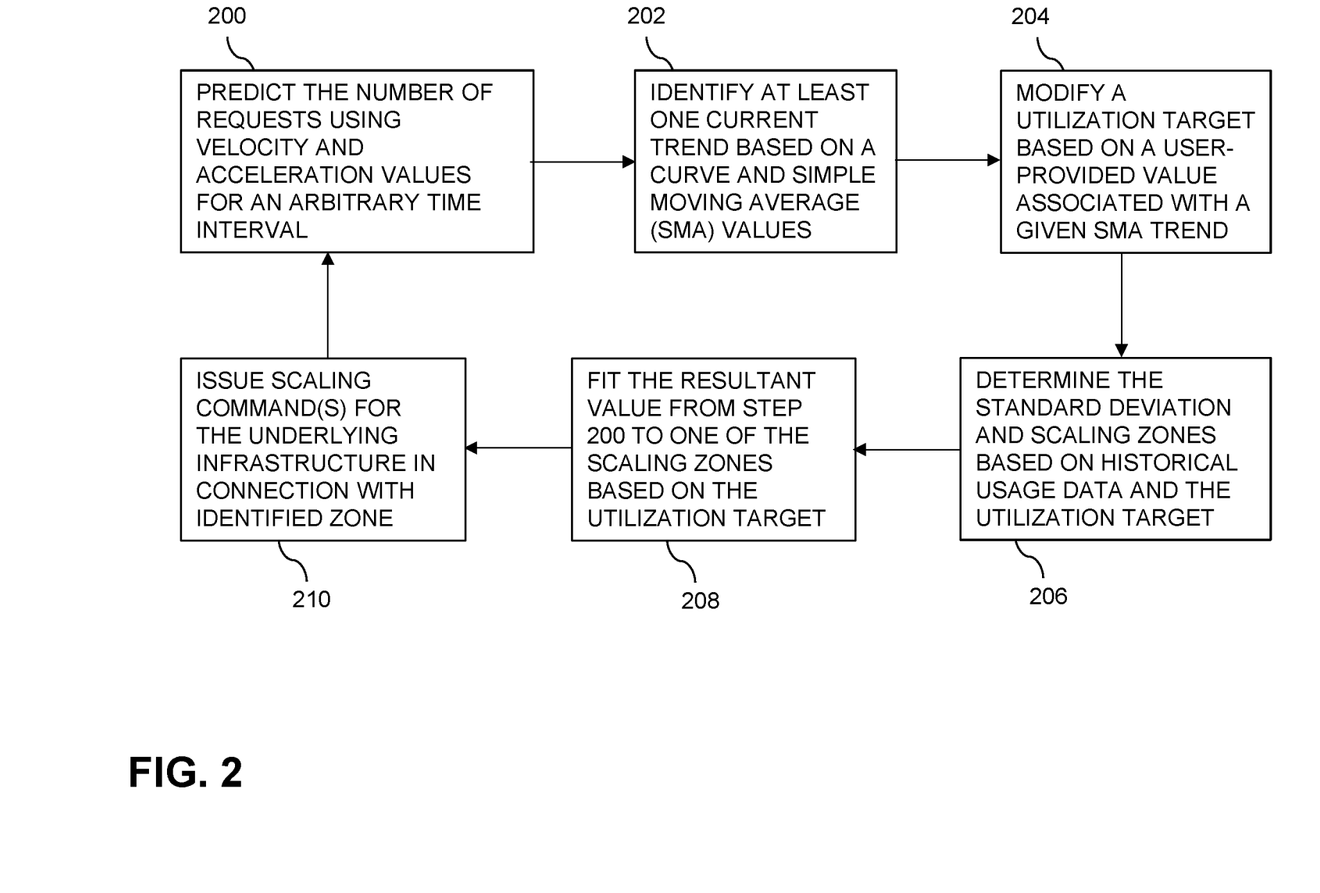
FIG. 2 shows a flow diagram for automated predictive infrastructure scaling in an illustrative embodiment.

FIG. 2 shows a flow diagram for automated predictive infrastructure scaling in an illustrative embodiment. As depicted in FIG. 2, step 200 includes evaluating or predicting (based at least in part on one or more Newtonian and/or Newtonian-based physics equations) the number of requests using the given velocity and acceleration for an arbitrary time interval. Step 202 includes identifying at least one current trend based on the curve and SMA values. In at least one embodiment, the curve noted in step 202 encompasses the relevant historical data or values and is plotted at every time interval (1) for a recent trend. In such an embodiment, the historical data or values may or may not include the predicated values based on the application usage.

Once the trend is identified, step 204 includes updating and/or modifying the utilization target (e.g., percentage) based at least in part on a user-provided value associated with that specific SMA trend. In at least one embodiment, a user can provide a single value of utilization or multiple values of utilization for one or more different trends. The basis of such a value could be, for example, based at least in part on organizational budgets and/or risk appetite for performance degradations. After the target utilization percentage is set, step 206 includes calculating the standard deviation and scaling zones (e.g., 10 scaling zones) based at least in part on historical usage/utilization data as well as on the utilization target. Step 208 includes fitting the resultant value from step 200 to one of the scaling zones based on the utilization target. Finally, when the target zone is identified, step 210 includes issuing the scaling command for the underlying infrastructure. Also, as depicted in FIG. 2, such an embodiment includes a closed loop (represented by the arrow from step 210 to step 200), which indicates that steps 200 through 210 are repeated for every time interval (t). Once the algorithm has results for a given time interval t, the algorithm can calculate results for the next time interval, t+1, as soon as computational data and/or arguments are available.

It should be noted that in one or more embodiments, different SMA periods and target utilization percentages can be selected for different workloads and scaling constraints.

Accordingly, as detailed herein, at least one embodiment includes generating infrastructure scaling predictions based on a Newtonian and/or Newtonian-based physics model that is constrained by standard deviation values to improve accuracy of the predictions. Such an embodiment can also include separating the standard deviation into zones for infrastructure utilization and using a target utilization percentage for selecting a zone that further defines the most likely size of infrastructure in the upcoming period. Further, such an embodiment can include identifying one or more trends in infrastructure utilization using SMA calculations and crossovers, and using the trend identification(s) to specify infrastructure scaling behavior and parameters.

As described herein, the algorithm(s) detailed in connection with one or more embodiments allows for significant flexibility in the scaling of workloads, and can be tailored as per the enterprise requirements, budgets and/or risk-taking appetites. Additionally, such an algorithm can be automatically updated and/or trained using outputs from previous iterations of algorithm execution.

Figure 3:
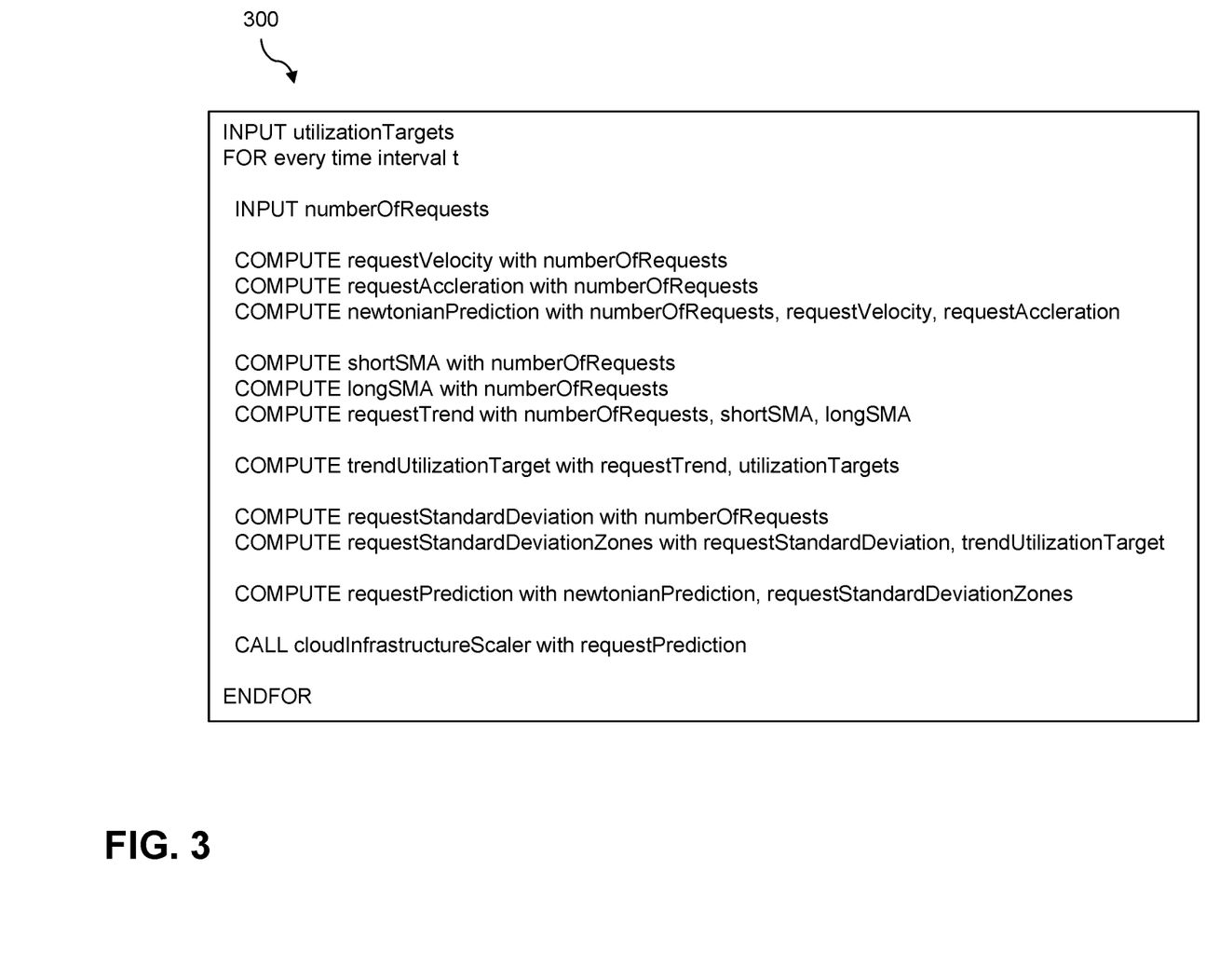
FIG. 3 shows an example pseudocode for implementing at least a portion of an automated predictive infrastructure scaling algorithm in an illustrative embodiment.

FIG. 3 shows an example pseudocode for implementing at least a portion of an automated predictive infrastructure scaling algorithm in an illustrative embodiment. In this embodiment, example pseudocode 300 is executed by or under the control of at least one processing system and/or device. For example, the example pseudocode 300 may be viewed as comprising a portion of a software implementation of at least part of automated predictive infrastructure scaling engine 105 of the FIG. 1 embodiment.

The example pseudocode 300 illustrates inputting one or more utilization target values, and for every time interval (t), inputting a number of requests and carrying out a number of computations. Specifically, pseudocode 300 includes computing a request velocity value with respect to the number of requests, as well as computing a request acceleration value with respect to the number of requests. Additionally, pseudocode 300 includes computing at least one Newtonian prediction with respect to the number of requests, the computed request velocity value and the computed request acceleration value. Further, pseudocode 300 includes computing a short-term SMA with respect to the number of requests as well as a long-term SMA with respect to the number of requests. Pseudocode 300 also includes computing at least one request trend with respect to the number of requests, the computed short-term SMA and the computed long-term SMA. Additionally, pseudocode 300 includes computing a trend utilization target with respect to the at least one request trend and one or more provided utilization targets.

As also depicted in FIG. 3, pseudocode 300 includes computing a standard deviation with respect to the number of requests, as well as computing standard deviation zones with respect to the request-based standard deviation and the trend utilization target. Further, pseudocode 300 includes computing a request prediction with respect to the Newtonian prediction and the computed standard deviation zones, and ultimately calling a cloud infrastructure scaler component and/or system with respect to the computed request prediction.

It is to be appreciated that this particular example pseudocode shows just one example implementation of an automated predictive infrastructure scaling algorithm, and alternative implementations of the process can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 4:
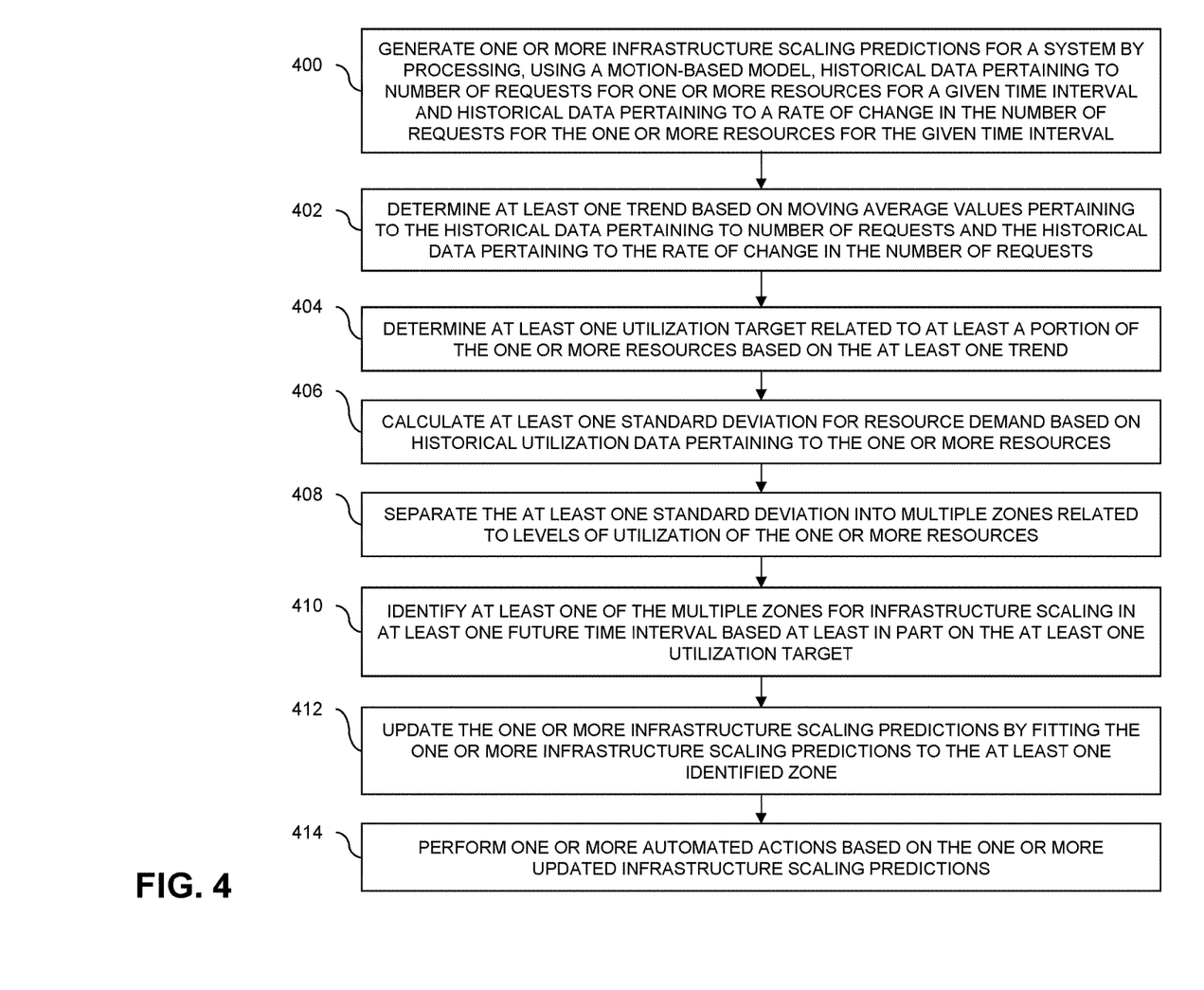
FIG. 4 is a flow diagram of a process for automated predictive infrastructure scaling in an illustrative embodiment.

FIG. 4 is a flow diagram of a process for automated predictive infrastructure scaling in an illustrative embodiment. It is to be understood that this particular process is only an example, and additional or alternative processes can be carried out in other embodiments.

In this embodiment, the process includes steps 400 through 414. These steps are assumed to be performed by automated predictive infrastructure scaling engine 105 utilizing elements 112, 114, 116, 118 and 120.

Step 400 includes generating one or more infrastructure scaling predictions for at least one system by processing, using at least one motion-based model, historical data pertaining to number of requests for one or more resources for a given time interval and historical data pertaining to a rate of change in the number of requests for the one or more resources for the given time interval. In at least one embodiment, generating one or more infrastructure scaling predictions includes predicting demand for virtual infrastructure for one or more workloads requiring variable amounts of the one or more resources. Additionally or alternatively, generating one or more infrastructure scaling predictions can include predicting a number of requests for at least a portion of the one or more resources for at least one future time interval.

Step 402 includes determining at least one trend based at least in part on moving average values pertaining to the historical data pertaining to number of requests and the historical data pertaining to the rate of change in the number of requests. In one or more embodiments, the one or more moving average values can include one or more SMA values and/or one or more EMA values.

Step 404 includes determining at least one utilization target related to at least a portion of the one or more resources based at least in part on the at least one trend. In at least one embodiment, determining the at least one utilization target includes determining, for each of the one or more resources, a percentage of capacity to be used by the at least one system for at least one future time interval. Additionally, in one or more embodiments, determining the at least one utilization target is further based at least in part on a user-provided value associated with the at least one trend.

Step 406 includes calculating at least one standard deviation for resource demand based at least in part on historical utilization data pertaining to the one or more resources. Step 408 includes separating the at least one standard deviation into multiple zones related to levels of utilization of the one or more resources. In at least one embodiment, separating the at least one standard deviation into multiple zones includes separating the at least one standard deviation into multiple zones from a first standard deviation value to a second standard deviation value in intervals of a predetermined number of standard deviations.

Step 410 includes identifying at least one of the multiple zones for infrastructure scaling in at least one future time interval based at least in part on the at least one utilization target. Step 412 includes updating the one or more infrastructure scaling predictions by fitting the one or more infrastructure scaling predictions to the at least one identified zone.

Step 414 includes performing one or more automated actions based at least in part on the one or more updated infrastructure scaling predictions. In at least one embodiment, performing the one or more automated actions includes automatically provisioning resources for the at least one system, in accordance with the one or more updated infrastructure scaling predictions. Additionally or alternatively, performing the one or more automated actions can include automatically deprovisioning resources from the at least one system, in accordance with the one or more updated infrastructure scaling predictions. Further, in one or more embodiments, performing the one or more automated actions includes automatically outputting at least one set of instructions to one or more entities within the at least one system, wherein the at least one set of instructions pertain to the one or more updated infrastructure scaling predictions.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically predict infrastructure scaling values by algorithmically processing historical usage data, standard deviation data, trend data, and resource utilization target data. These and other embodiments can effectively overcome problems associated with delays and performance degradation.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
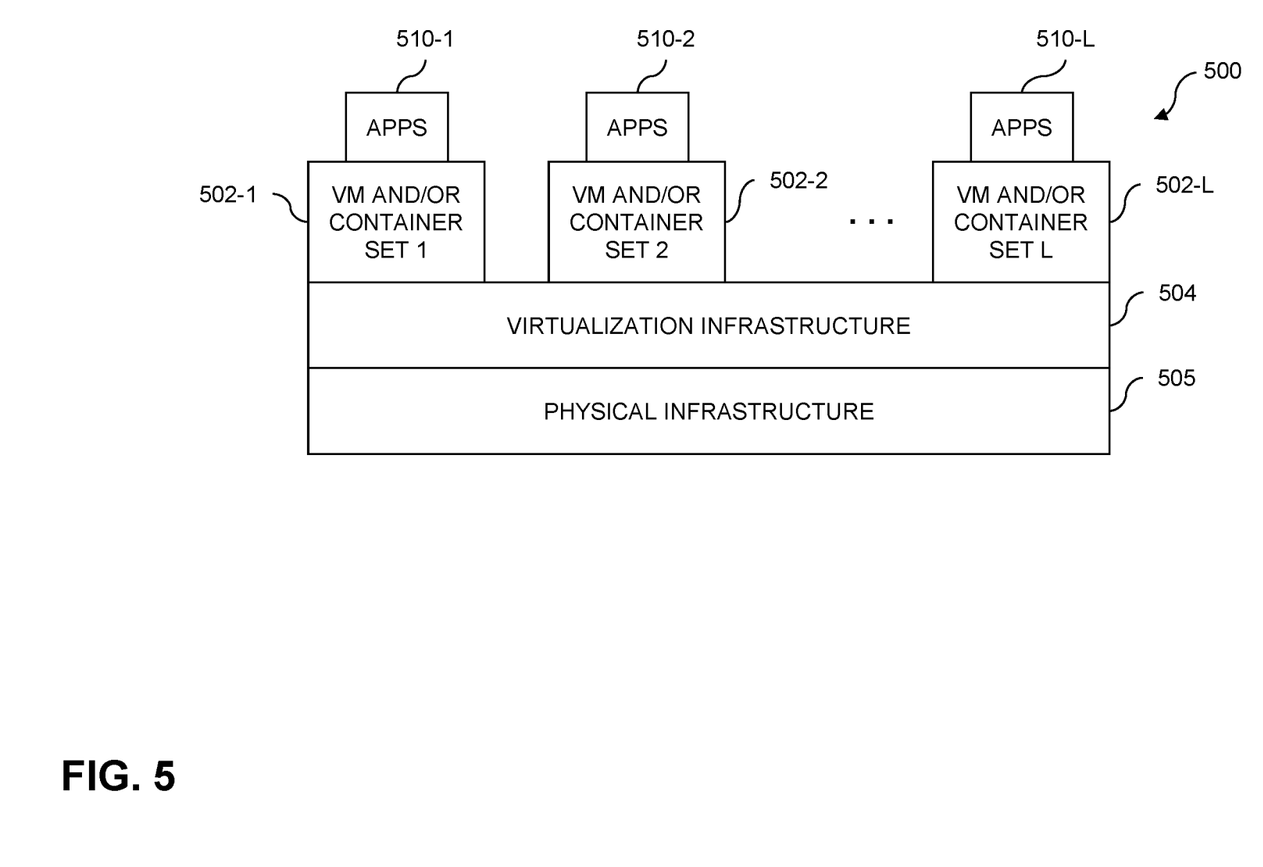
FIGS. 5 and 6 show examples of processing platforms that may be utilized to implement at least a portion of an information processing system in illustrative embodiments.
Figure 6:
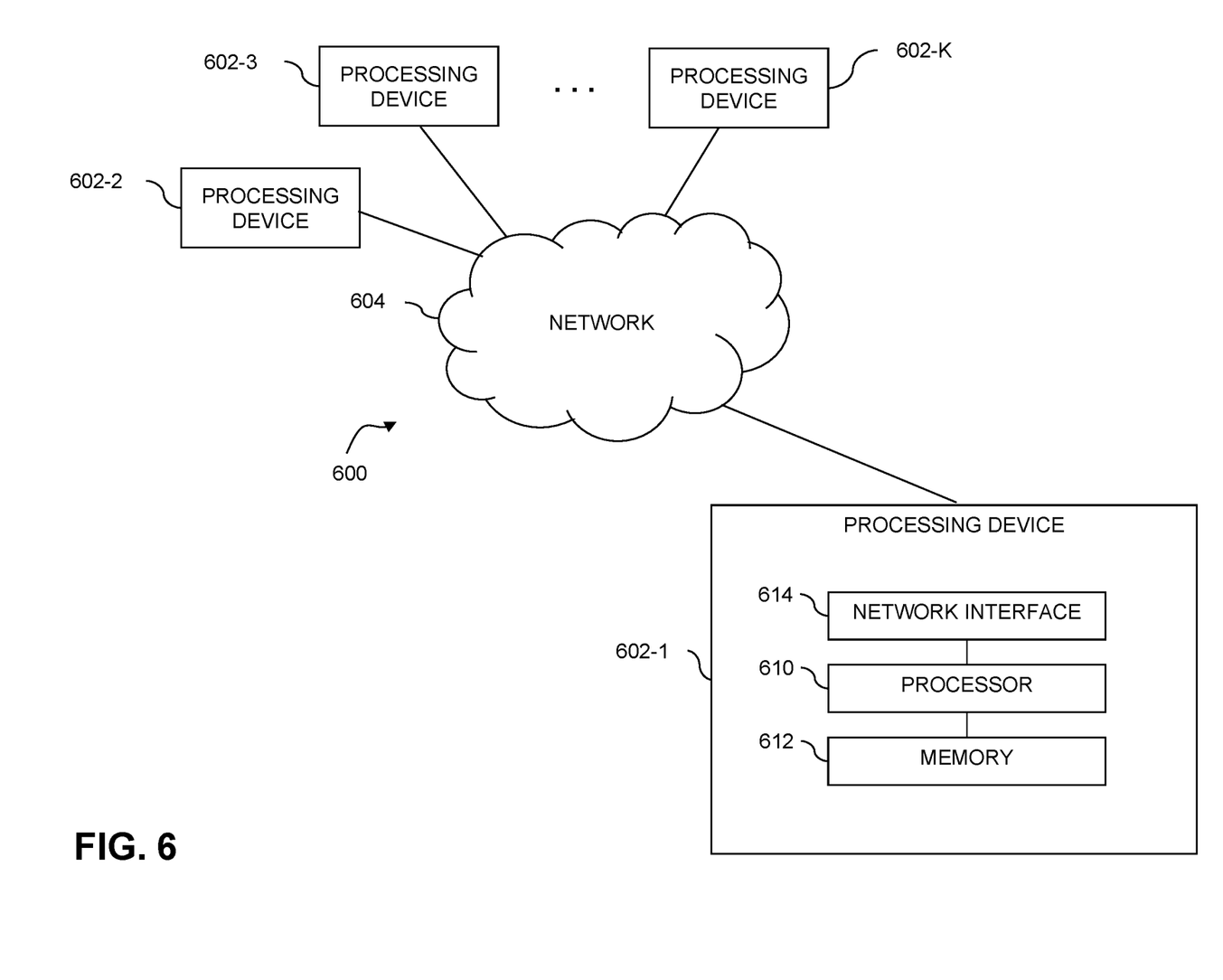

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
generating one or more infrastructure scaling predictions for at least one cloud computing environment by processing, in a machine learning system implemented utilizing a processor and a memory of at least one processing device, and using at least one motion-based model of the machine learning system, historical data pertaining to number of requests for one or more infrastructure resources for a given time interval and historical data pertaining to a rate of change in the number of requests for the one or more infrastructure resources for the given time interval;
determining, in the machine learning system, at least one trend based at least in part on moving average values pertaining to the historical data pertaining to number of requests and the historical data pertaining to the rate of change in the number of requests;

determining, in the machine learning system, at least one utilization target related to at least a portion of the one or more infrastructure resources based at least in part on the at least one trend;

calculating, in the machine learning system, at least one standard deviation for infrastructure resource demand based at least in part on historical utilization data pertaining to the one or more infrastructure resources;

separating, in the machine learning system, the at least one standard deviation into multiple zones related to levels of utilization of the one or more infrastructure resources;

identifying, in the machine learning system, at least one of the multiple zones for infrastructure scaling in at least one future time interval based at least in part on the at least one utilization target;

updating, in the machine learning system, the one or more infrastructure scaling predictions by fitting the one or more infrastructure scaling predictions to the at least one identified zone; and performing one or more automated actions based at least in part on the one or more updated infrastructure scaling predictions, wherein performing the one or more automated actions comprises:
  scaling, via at least one cloud infrastructure scaler system, and in accordance with the one or more updated infrastructure scaling predictions, virtual infrastructure resources, including compute resources and storage resources, within the at least one cloud computing environment; and
  reducing system latency associated with the at least one cloud computing environment by at least one of automatically adding infrastructure resources to the at least one cloud computing environment and automatically removing infrastructure resources from the at least one cloud computing environment, in connection with scaling via the at least one cloud infrastructure scaler system;

wherein the method is performed by the at least one processing device comprising the processor coupled to the memory.

2. The computer-implemented method of claim 1, wherein performing the one or more automated actions comprises automatically provisioning infrastructure resources for the at least one cloud computing environment, in accordance with the one or more updated infrastructure scaling predictions.

3. The computer-implemented method of claim 1, wherein performing the one or more automated actions comprises automatically deprovisioning infrastructure resources from the at least one cloud computing environment, in accordance with the one or more updated infrastructure scaling predictions.

4. The computer-implemented method of claim 1, wherein performing the one or more automated actions comprises automatically outputting at least one set of instructions to one or more entities within the at least one cloud computing environment, wherein the at least one set of instructions pertain to the one or more updated infrastructure scaling predictions.

5. The computer-implemented method of claim 1, wherein generating one or more infrastructure scaling predictions comprises predicting demand for virtual infrastructure for one or more workloads requiring variable amounts of the one or more infrastructure resources.

6. The computer-implemented method of claim 1, wherein generating one or more infrastructure scaling predictions comprises predicting a number of requests for at least a portion of the one or more infrastructure resources for at least one future time interval.

7. The computer-implemented method of claim 1, wherein the one or more moving average values comprise one or more simple moving average values.

8. The computer-implemented method of claim 1, wherein the one or more moving average values comprise one or more exponential moving average values.

9. The computer-implemented method of claim 1, wherein determining the at least one utilization target comprises determining, for each of the one or more infrastructure resources, a percentage of capacity to be used by the at least one cloud computing environment for at least one future time interval.

10. The computer-implemented method of claim 1, wherein determining the at least one utilization target is further based at least in part on a user-provided value associated with the at least one trend.

11. The computer-implemented method of claim 1, wherein separating the at least one standard deviation into multiple zones comprises separating the at least one standard deviation into multiple zones from a first standard deviation value to a second standard deviation value in intervals of a predetermined number of standard deviations.

12. A non-transitory processor-readable storage medium having stored therein program code of one or more software programs, wherein the program code when executed by at least one processing device causes the at least one processing device:
  to generate one or more infrastructure scaling predictions for at least one cloud computing environment by processing, in a machine learning system implemented utilizing a processor and a memory of the at least one processing device, and using at least one motion-based model of the machine learning system, historical data pertaining to number of requests for one or more infrastructure resources for a given time interval and historical data pertaining to a rate of change in the number of requests for the one or more infrastructure resources for the given time interval;
  to determine, in the machine learning system, at least one trend based at least in part on moving average values pertaining to the historical data pertaining to number of requests and the historical data pertaining to the rate of change in the number of requests;
  to determine, in the machine learning system, at least one utilization target related to at least a portion of the one or more infrastructure resources based at least in part on the at least one trend;
  to calculate, in the machine learning system, at least one standard deviation for infrastructure resource demand based at least in part on historical utilization data pertaining to the one or more infrastructure resources;
  to separate, in the machine learning system, the at least one standard deviation into multiple zones related to levels of utilization of the one or more infrastructure resources;
  to identify, in the machine learning system, at least one of the multiple zones for infrastructure scaling in at least one future time interval based at least in part on the at least one utilization target;
  to update, in the machine learning system, the one or more infrastructure scaling predictions by fitting the one or more infrastructure scaling predictions to the at least one identified zone; and to perform one or more automated actions based at least in part on the one or more updated infrastructure scaling predictions, wherein performing the one or more automated actions comprises:

scaling, via at least one cloud infrastructure scaler system, and in accordance with the one or more updated infrastructure scaling predictions, virtual infrastructure resources, including compute resources and storage resources, within the at least one cloud computing environment; and reducing system latency associated with the at least one cloud computing environment by at least one of automatically adding infrastructure resources to the at least one cloud computing environment and automatically removing infrastructure resources from the at least one cloud computing environment, in connection with scaling via the at least one cloud infrastructure scaler system.

13. The non-transitory processor-readable storage medium of claim 12, wherein performing the one or more automated actions comprises automatically provisioning infrastructure resources for the at least one cloud computing environment, in accordance with the one or more updated infrastructure scaling predictions.

14. The non-transitory processor-readable storage medium of claim 12, wherein performing the one or more automated actions comprises automatically deprovisioning infrastructure resources from the at least one cloud computing environment, in accordance with the one or more updated infrastructure scaling predictions.

15. The non-transitory processor-readable storage medium of claim 12, wherein performing the one or more automated actions comprises automatically outputting at least one set of instructions to one or more entities within the at least one cloud computing environment, wherein the at least one set of instructions pertain to the one or more updated infrastructure scaling predictions.

16. The non-transitory processor-readable storage medium of claim 12, wherein generating one or more infrastructure scaling predictions comprises predicting demand for virtual infrastructure for one or more workloads requiring variable amounts of the one or more infrastructure resources.

17. An apparatus comprising:

at least one processing device comprising a processor coupled to a memory;

the at least one processing device being configured:

to generate one or more infrastructure scaling predictions for at least one cloud computing environment by processing, in a machine learning system implemented utilizing the processor and the memory of the at least one processing device, and using at least one motion-based model of the machine learning system, historical data pertaining to number of requests for one or more infrastructure resources for a given time interval and historical data pertaining to a rate of change in the number of requests for the one or more infrastructure resources for the given time interval;

to determine, in the machine learning system, at least one trend based at least in part on moving average values pertaining to the historical data pertaining to number of requests and the historical data pertaining to the rate of change in the number of requests;

to determine, in the machine learning system, at least one utilization target related to at least a portion of the one or more infrastructure resources based at least in part on the at least one trend;

to calculate, in the machine learning system, at least one standard deviation for infrastructure resource demand based at least in part on historical utilization data pertaining to the one or more infrastructure resources;

to separate, in the machine learning system, the at least one standard deviation into multiple zones related to levels of utilization of the one or more infrastructure resources;

to identify, in the machine learning system, at least one of the multiple zones for infrastructure scaling in at least one future time interval based at least in part on the at least one utilization target;

to update, in the machine learning system, the one or more infrastructure scaling predictions by fitting the one or more infrastructure scaling predictions to the at least one identified zone; and to perform one or more automated actions based at least in part on the one or more updated infrastructure scaling predictions, wherein performing the one or more automated actions comprises:

scaling, via at least one cloud infrastructure scaler system, and in accordance with the one or more updated infrastructure scaling predictions, virtual infrastructure resources, including compute resources and storage resources, within the at least one cloud computing environment; and reducing system latency associated with the at least one cloud computing environment by at least one of automatically adding infrastructure resources to the at least one cloud computing environment and automatically removing infrastructure resources from the at least one cloud computing environment, in connection with scaling via the at least one cloud infrastructure scaler system.

18. The apparatus of claim 17, wherein performing the one or more automated actions comprises automatically provisioning infrastructure resources for the at least one cloud computing environment, in accordance with the one or more updated infrastructure scaling predictions.

19. The apparatus of claim 17, wherein performing the one or more automated actions comprises automatically deprovisioning infrastructure resources from the at least one cloud computing environment, in accordance with the one or more updated infrastructure scaling predictions.

20. The apparatus of claim 17, wherein performing the one or more automated actions comprises automatically outputting at least one set of instructions to one or more entities within the at least one cloud computing environment, wherein the at least one set of instructions pertain to the one or more updated infrastructure scaling predictions.

* * * * *